United States Patent
Inoue et al.

(10) Patent No.: US 8,086,005 B2
(45) Date of Patent: Dec. 27, 2011

(54) MEDICAL IMAGE PROCESSING APPARATUS AND MEDICAL IMAGE PROCESSING METHOD

(75) Inventors: Ryoko Inoue, Hachioji (JP); Hirokazu Nishimura, Hachioji (JP); Hideki Tanaka, Tama (JP); Kenji Nakamura, Chiba (JP); Miho Sawa, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 715 days.

(21) Appl. No.: 12/204,330

(22) Filed: Sep. 4, 2008

(65) Prior Publication Data

US 2009/0003671 A1    Jan. 1, 2009

Related U.S. Application Data

(63) Continuation of application No. PCT/JP2007/052347, filed on Feb. 9, 2007.

(30) Foreign Application Priority Data

Mar. 8, 2006  (JP) ................................. 2006-063234

(51) Int. Cl.
*G06K 9/00* (2006.01)
(52) U.S. Cl. ........................ 382/128; 382/154; 382/190
(58) Field of Classification Search .................. 382/128, 382/154, 190
See application file for complete search history.

(56) References Cited

U.S. PATENT DOCUMENTS

| 7,102,634 B2 * | 9/2006 | Kim et al. ..................... 345/419 |
| 2003/0223627 A1 | 12/2003 | Yoshida et al. |
| 2005/0165303 A1 | 7/2005 | Kleen et al. |

FOREIGN PATENT DOCUMENTS

| JP | 11-337845 | 12/1999 |
| JP | 2005-506140 | 3/2005 |
| JP | 2005-177477 | 7/2005 |
| WO | WO 03/034176 A2 | 4/2003 |

OTHER PUBLICATIONS

Yan-jun, P., "A new tissue segmentation algorithm in 3d data based on boundary model and local character structure", Proceedings. SPIE—The International Society for Optical Engineering, vol. 6044, 2005, p. 60441J.1-60441J.6.

* cited by examiner

*Primary Examiner* — Phat Cao
(74) *Attorney, Agent, or Firm* — Scully, Scott, Murphy & Presser, P.C.

(57) ABSTRACT

A medical image processing apparatus of the present invention includes an edge extracting section that extracts edges of an inputted two-dimensional image, a three-dimensional-model estimating section that estimates a three-dimensional model on the basis of the two-dimensional image, a voxel extracting section that extracts, on the basis of positions of respective voxels, where the edges are present, a predetermined voxel group to be set as a calculation object of a shape feature value, a shape-feature-value calculating section that calculates the shape feature value for at least a part of voxels among the predetermined voxel group, a three-dimensional-shape extracting section that extracts a voxel group, a three-dimensional model of which is estimated as a predetermined shape, on the basis of the shape feature value, and a tuberal-shape detecting section that detects the voxel group as a voxel group forming a tuberal shape in the three-dimensional model of the living tissue.

8 Claims, 9 Drawing Sheets

FIG.6
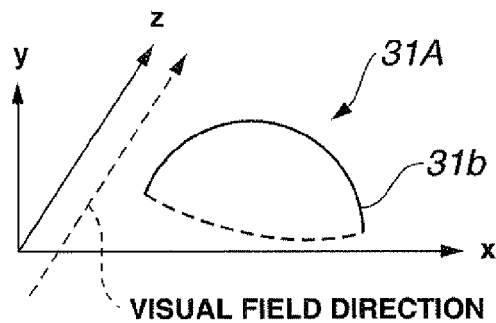
FIG.7
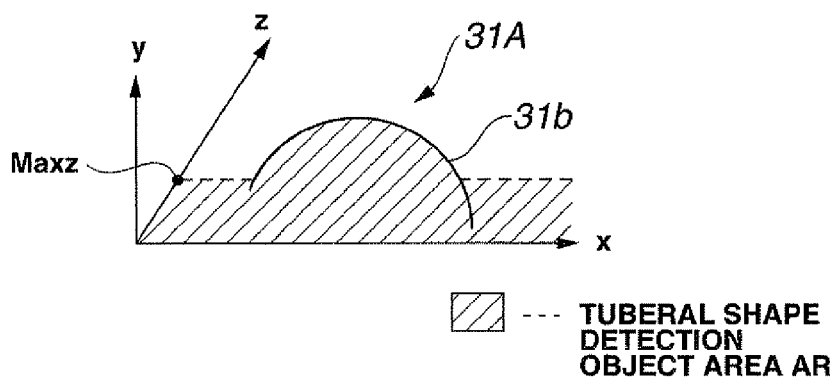
FIG.8
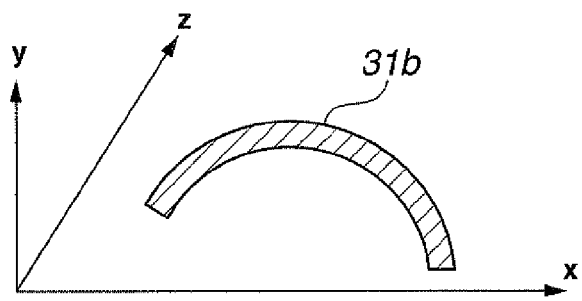

MEDICAL IMAGE PROCESSING APPARATUS AND MEDICAL IMAGE PROCESSING METHOD

CROSS REFERENCE TO RELATED APPLICATION

This application is a continuation application of PCT/JP2007/052347 filed on Feb. 9, 2007 and claims benefit of Japanese Application No. 2006-063234 filed in Japan on Mar. 8, 2006, the entire contents of which are incorporated herein by this reference.

BACKGROUND OF THE INVENTION

1. Field of the Invention

The present invention relates to a medical image processing apparatus and a medical image processing method, and, more particularly to a medical image processing apparatus and a medical image processing method that are capable of detecting a tuberal shape in a three-dimensional model of a living tissue in a body cavity.

2. Description of the Related Art

An endoscope system including an endoscope and a medical image processing apparatus is widely used in the medical field and the like. Specifically, the endoscope system includes an endoscope including an insertion section inserted into a body cavity as a living body, an objective optical system arranged at a distal end portion of the insertion section, and an image pickup section that picks up an image in the body cavity focused by the objective optical system and outputs the image as an image pickup signal and a medical image processing apparatus that performs, on the basis of the image pickup signal, processing for causing a monitor or the like as a display section to display the image in the body cavity. A user performs observation of, for example, an organ as a subject in the body cavity on the basis of the image in the body cavity displayed on the monitor or the like as the display section.

The endoscope system including the configuration described above can also pick up an image of a digestive tract mucosa of, for example, a large intestine as a subject in the body cavity. Therefore, the user can comprehensively observe various opinions concerning, for example, a hue of a mucosa, a shape of a lesion, a microstructure of a mucosa surface.

Moreover, in recent years, an endoscope apparatus is proposed, for example, described in Japanese Patent Application Laid-Open Publication No. 11-337845 that is capable of generating a three-dimensional model of the subject, on the basis of data of three-dimensional images corresponding to image pickup signals of images of a subject picked up by an endoscope.

On the other hand, as a method for detecting a lesion area such as a polyp in a three-dimensional model, a method is proposed described in US Patent Application Publication No. 2003/0223627 that is capable of detecting a lesion area in the three-dimensional model by performing evaluation of a shape of the three-dimensional model while using shape feature values based on a curvature such as Shape Index and Curvedness.

SUMMARY OF THE INVENTION

A first medical image processing apparatus in the present invention includes an edge extracting section that extracts, on the basis of a two-dimensional image of an image of a living tissue in a body cavity inputted from a medical image pickup apparatus, edges of the two-dimensional image, a three-dimensional-model estimating section that estimates a three-dimensional model of the living tissue on the basis of the two-dimensional image, a voxel extracting section that extracts, on the basis of positions of respective voxels, where the edges are present, estimated as a part of the three-dimensional model, a predetermined voxel group to be set as a calculation object of a shape feature value, a shape-feature-value calculating section that calculates the shape feature value for at least a part of voxels among the predetermined voxel group extracted by the voxel extracting section, and a tuberal-shape detecting section that extracts, on the basis of the shape feature value, a voxel group, a three-dimensional model of which is estimated as a predetermined shape, among at least the part of voxels and detects the voxel group as a voxel group forming a tuberal shape in the three-dimensional model of the living tissue.

In a second medical image processing apparatus in the present invention, preferably, the predetermined voxel group is a voxel group present nearer to the medical image pickup apparatus in a visual field direction than a predetermined one voxel included in the respective voxels in which the edges are present.

In a third medical image processing apparatus in the present invention, preferably, the predetermined one voxel is one voxel present on a farthest side in the visual field direction among the respective voxels in which the edges are present.

In a fourth medical image processing apparatus in the present invention, preferably, the predetermined shape is a convex shape.

A fifth medical image processing apparatus in the present invention includes an edge extracting section that thins and extracts, on the basis of an inputted two-dimensional image of an image of a living tissue in a body cavity, edges of the two-dimensional image, an edge-information acquiring section that acquires, concerning the respective edges extracted by the edge extracting section, position information of positions as ends of one edge and shape information as information concerning a shape of the one edge calculated on the basis of the position information, a three-dimensional-model estimating section that estimates a three-dimensional model of the living tissue on the basis of the two-dimensional image, a three-dimensional-model-information acquiring section that acquires, on the basis of the position information and the shape information, depth information as information concerning the depth of the three-dimensional model of the living tissue and height information as information concerning the height of the three-dimensional model of the living tissue, and a tuberal-shape detecting section that detects, on the basis of the depth information and the height information, whether the living tissue has a tuberal shape.

In a sixth medical image processing apparatus in the present invention, preferably, the shape information has information concerning a position of a midpoint in a thin line of the one edge and information concerning a position of a midpoint of a straight line connecting two end points at ends of the one edge.

A first medical image processing method in the present invention includes an edge extracting step of extracting, on the basis of a two-dimensional image of an image of a living tissue in a body cavity inputted from a medical image pickup apparatus, edges of the two-dimensional image, a three-dimensional-model estimating step of estimating a three-dimensional model of the living tissue on the basis of the two-dimensional image, a voxel extracting step of extracting, on the basis of positions of respective voxels, where the edges are present estimated as a part of the three-dimensional model, a predetermined voxel group to be set as a calculation object of a shape feature value, a shape-feature-value calculating step of calculating the shape feature value for at least a part of voxels among the voxel group extracted in the voxel extracting step, and a tuberal-shape detecting step of extracting, on the basis of the shape feature value, a voxel group, a three-dimensional model of which is estimated as a predetermined shape, among at least the part of voxels and detecting the voxel group as a voxel group forming a tuberal shape in the three-dimensional model of the living tissue.

In a second medical image processing method in the present invention, preferably, the predetermined voxel group is a voxel group present nearer to the medical image pickup apparatus in a visual field direction than a predetermined one voxel included in the respective voxels in which the edges are present.

In a third medical image processing method in the present invention, preferably, the predetermined one voxel is one voxel present on a farthest side in the visual field direction among the respective voxels in which the edges are present.

In a fourth medical image processing method in the present invention, preferably, the predetermined shape is a convex shape.

A fifth medical image processing method in the present invention includes an edge extracting step of thinning and extracting, on the basis of an inputted two-dimensional image of an image of a living tissue in a body cavity, edges of the two-dimensional image, an edge-information acquiring step of acquiring, concerning the respective edges extracted in the edge extracting step, position information of positions as ends of one edge and shape information as information concerning a shape of the one edge calculated on the basis of the position information, a three-dimensional-model estimating step of estimating a three-dimensional model of the living tissue on the basis of the two-dimensional image, a three-dimensional-model-information acquiring step of acquiring, on the basis of the position information and the shape information, depth information as information concerning the depth of the three-dimensional model of the living tissue and height information as information concerning the height of the three-dimensional model of the living tissue, and a tuberal-shape detecting step of detecting, on the basis of the depth information and the height information, whether the living tissue has a tuberal shape.

In a sixth medical image processing method in the present invention, preferably, the shape information has information concerning a position of a midpoint in a thin line of the one edge and information concerning a position of a midpoint of a straight line connecting two end points at ends of the one edge.

BRIEF DESCRIPTION OF THE DRAWINGS

FIG. 6 is a diagram showing an example of a three-dimensional model of the living tissue estimated by the medical image processing apparatus shown in FIG. 1;
FIG. 7 is a diagram showing an example of an area as an object of processing for detecting the tuberal shape in the three-dimensional model of the living tissue in the flowchart in FIG. 5;
FIG. 8 is a diagram showing an example different from that shown in FIG. 7 of the area as the object of the processing for detecting the tuberal shape in the three-dimensional model of the living tissue in the flowchart in FIG. 5.

DETAILED DESCRIPTION OF THE PREFERRED EMBODIMENT(S)

Embodiments of the present invention will be hereinafter explained with reference to the drawings.

First Embodiment

Figure 1:
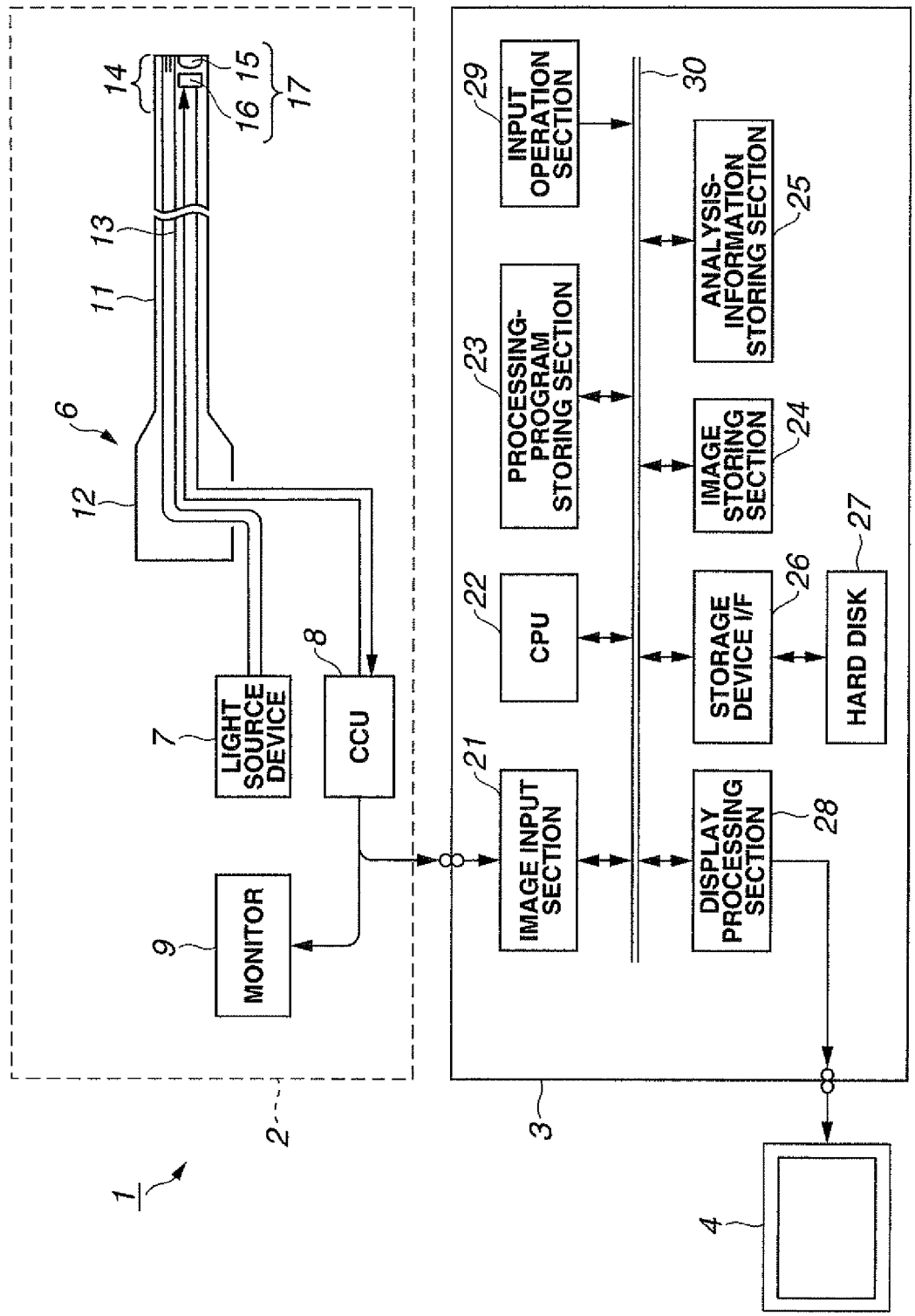
FIG. 1 is a diagram showing an example of an overall configuration of an endoscope system in which a medical image processing apparatus according to each of embodiments of the present invention is used.
Figure 2:
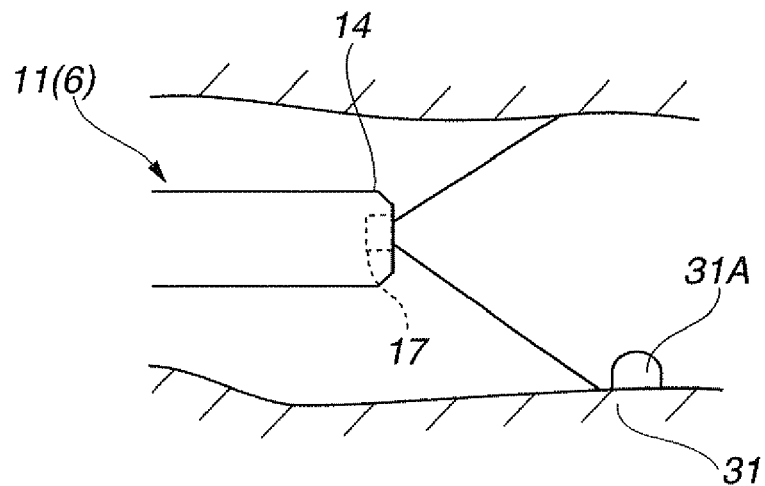
FIG. 2 is a schematic diagram showing a state in the case in which an endoscope shown in FIG. 1 is inserted into a tubular organ.
Figure 3:
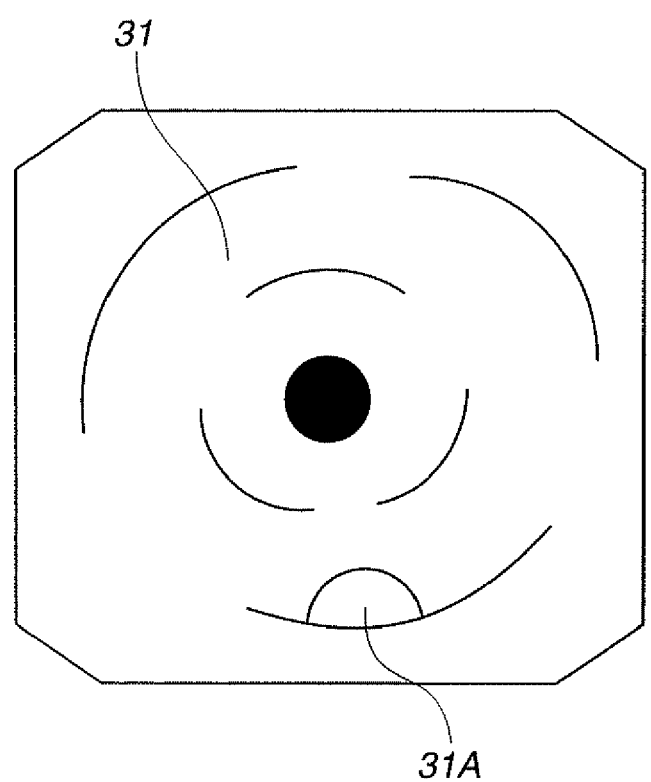
FIG. 3 is a schematic diagram showing an image of the tubular organ and a living tissue picked up by the endoscope in the state shown in FIG. 2.
Figure 4:
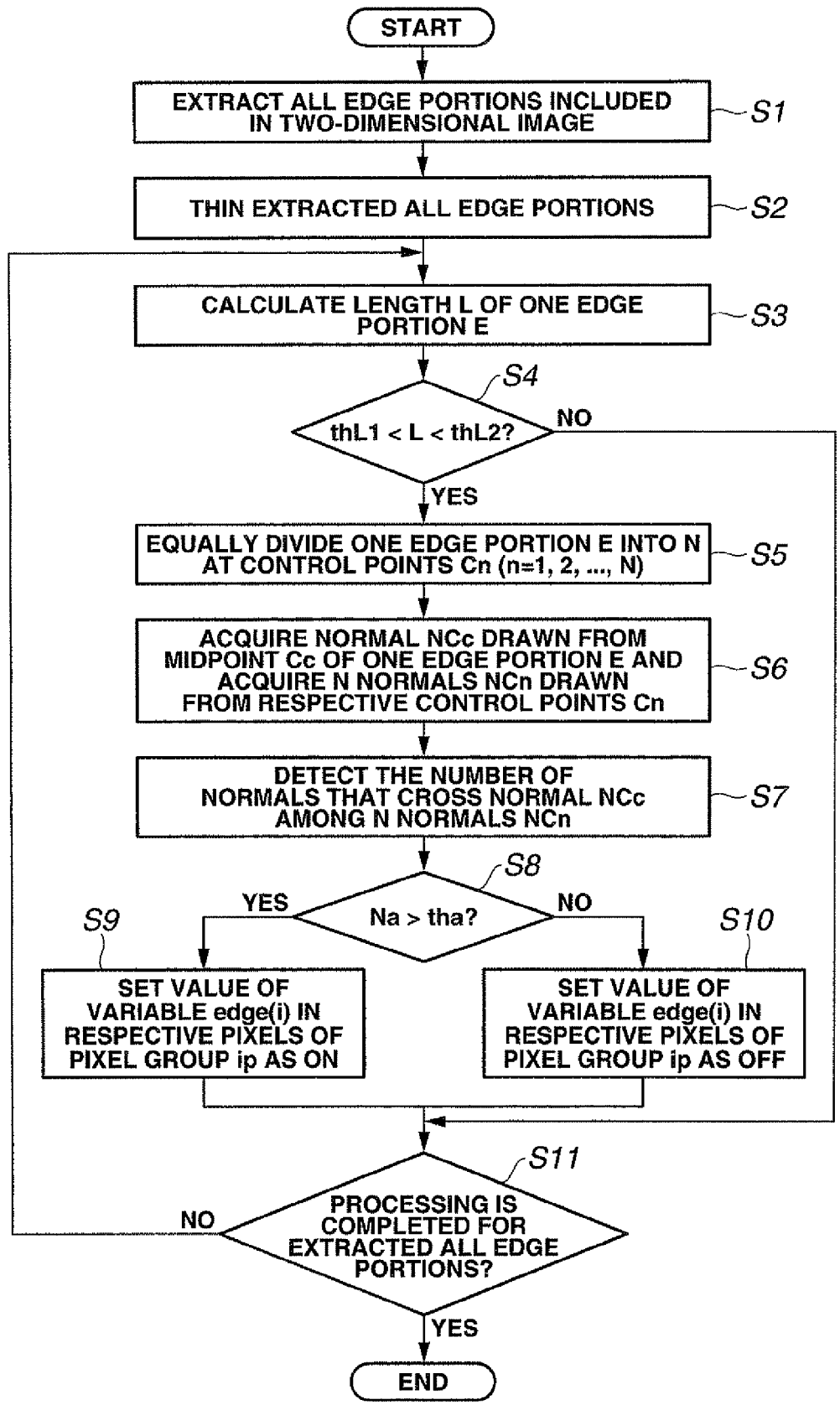
FIG. 4 is a flowchart showing a procedure of processing performed by the medical image processing apparatus shown in FIG. 1 in the first embodiment when the medical image processing apparatus extracts edge portions in a two-dimensional image of the image of the living tissue.
Figure 5:
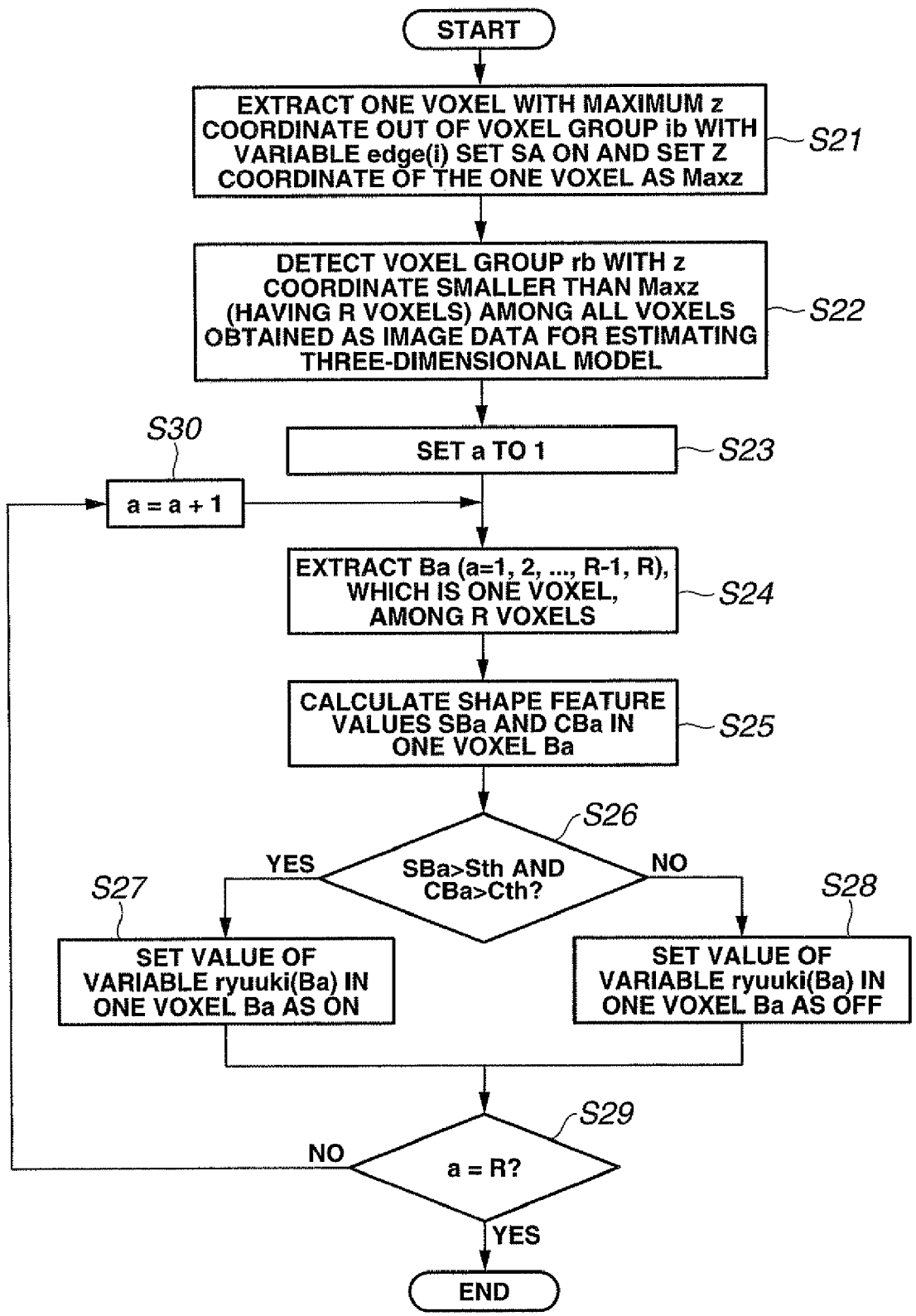
FIG. 5 is a flowchart showing a procedure of processing performed by the medical image processing apparatus shown in FIG. 1 in the first embodiment when the medical image processing apparatus detects a tuberal shape in a three-dimensional model of the living tissue.

FIGS. 1 to 8 relate to a first embodiment. FIG. 1 is a diagram showing an example of an overall configuration of an endoscope system in which a medical image processing apparatus according to the present embodiment is used. FIG. 2 is a schematic diagram showing a state in the case in which an endoscope is inserted into a tubular organ. FIG. 3 is a schematic diagram showing an image of the tubular organ and a living tissue picked up by the endoscope. FIG. 4 is a flowchart showing a procedure of processing performed by the medical image processing apparatus shown in FIG. 1 when the medical image processing apparatus extracts edge portions in a two-dimensional image of the image of the living tissue. FIG. 5 is a flowchart showing a procedure of processing performed by the medical image processing apparatus shown in FIG. 1 when the medical image processing apparatus detects a tuberal shape in a three-dimensional model of the living tissue. FIG. 6 is a diagram showing an example of a three-dimensional model of the living tissue estimated by the medical image processing apparatus shown in FIG. 1. FIG. 7 is a diagram showing an example of an area as an object of processing for detecting the tuberal shape in the three-dimensional model of the living tissue in the flowchart in FIG. 5. FIG. 8 is a diagram showing an example different from that shown in FIG. 7 of the area as the object of the processing for detecting the tuberal shape in the three-dimensional model of the living tissue in the flowchart in FIG. 5.

A main part of the endoscope system 1 is configured by including, as shown in FIG. 1, a medical observation apparatus 2 that picks up an image of a subject and outputs a two-dimensional image of the image of the subject, a medical image processing apparatus 3 that is configured by a personal computer or the like, applies image processing to a video signal of the two-dimensional image outputted from the medical observation apparatus 2, and outputs, as an image signal, the video signal subjected to the image processing, and a monitor 4 that displays an image based on the image signal outputted from the medical image processing apparatus 3.

A main part of the medical observation apparatus 2 is configured by including an endoscope 6 that is inserted into a body cavity and picks up an image of a subject in the body cavity and outputs the image as an image pickup signal, a light source device 7 that supplies illumination light for illuminating the subject, an image of which is picked up by the endoscope 6, a camera control unit (hereinafter abbreviated as CCU) 8 that performs various kinds of control for the endoscope 6, applies signal processing to the image pickup signal outputted from the endoscope 6, and outputs the image pickup signal as a video signal of a two-dimensional image, and a monitor 9 that displays the image of the subject picked up by the endoscope 6.

The endoscope 6 as a medical image pickup apparatus is configured by including an insertion section 11 inserted into a body cavity and an operation section 12 provided on a proximal end side of the insertion section 11. A light guide 31 for transmitting the illumination light supplied from the light source device 7 is inserted through a portion extending from the proximal end side in the insertion section 11 to a distal end portion 14 on a distal end side in the insertion section 11.

A distal end side of the light guide 13 is arranged in the distal end portion 14 of the endoscope 6 and a rear end side thereof is connected to the light source device 7. Since the light guide 13 has such a configuration, the illumination light supplied from the light source device 7 is transmitted by the light guide 13 and, then, emitted from a not-shown illumination window provided on a distal end surface of the distal end portion 14 of the insertion section 11. Since the illumination light is emitted from the not-shown illumination window, a living tissue or the like as a subject is illuminated.

In the distal end portion 14 of the endoscope 6 is provided an image pickup section 17 having an objective optical system 15 attached to a not-shown observation window adjacent to the not-shown illumination window and an image pickup device 16 arranged in an image forming position of the objective optical system 15 and configured by, for example, a CCD (charge coupled device). With such a configuration, an image of a subject image-formed by the objective optical system 15 is picked up by the image pickup device 16 and, then, outputted as an image pickup signal.

The image pickup device 16 is connected to the CCU 8 via a signal line. The image pickup device 16 is driven on the basis of a driving signal outputted from the CCU 8 and outputs an image pickup signal to the CCU 8.

The image pickup signal inputted to the CCU 8 is subjected to signal processing in a not-shown signal processing circuit provided in the inside of the CCU 8 to be converted into a video signal of a two-dimensional image and outputted. The video signal of the two-dimensional image outputted from the CCU 8 is outputted to the monitor 9 and the medical image processing apparatus 3. Consequently, an image of a subject based on the video signal outputted from the CCU 8 is displayed on the monitor 9 as a two-dimensional image.

The medical image processing apparatus 3 has an image input section 21 that applies A/D conversion to a video signal of a two-dimensional image outputted from the medical observation apparatus 2 and outputs the video signal, a CPU 22 as a central arithmetic processing unit that applies image processing to the video signal outputted from the image input section 21, a processing-program storing section 23 in which a processing program concerning the image processing is written, an image storing section 24 that stores the video signal and the like outputted from the image input section 21, and an information storing section 25 that stores image data and the like as a result of the image processing by the CPU 22.

The medical image processing apparatus 3 has a storage device interface 26, a hard disk 27 as a storage device that stores image data and the like as a result of the image processing by the CPU 22 via the storage device interface 26, a display processing section 28 that performs, on the basis of the image data as a result of the image processing by the CPU 22, display processing for displaying the image data on the monitor 4 and outputs, as an image signal, the image data subjected to the display processing, and an input operation section 29 configured by a keyboard and the like with which a user can input parameters in the image processing performed by the CPU 22 and operation instructions to the medical image processing apparatus 3. The monitor 4 displays an image based on the image signal outputted from the display processing section 28.

The image input section 21, the CPU 22, the processing-program storing section 23, the image storing section 24, the information storing section 25, the storage device interface 26, the display processing section 28, and the input operation section 29 of the medical image processing apparatus 3 are connected to one another via a data bus 30.

Next, an action of the endoscope system 1 is explained.

First, as shown in FIG. 2, a user inserts the insertion section 11 of the endoscope 6 into a tubular organ 31, for example, a large intestine. When the insertion section 11 is inserted into the tubular organ 31 by the user, an image of a living tissue 31A, for example, as a lesion area present in an inner wall of the tubular organ 31 is picked up as an image shown in FIG. 3 by the image pickup section 17 provided in the distal end portion 14. The image of the tubular organ 31 and the living tissue 31A picked up by the image pickup section 17 as the image shown in FIG. 3 is outputted to the CCU 8 as an image pickup signal.

The CCU 8 applies signal processing to the image pickup signal outputted from the image pickup device 16 of the image pickup section 17 in the not-shown signal processing circuit to thereby convert the image pickup signal as a video signal of a two-dimensional image and output the video signal. The monitor 9 displays, on the basis of the video signal outputted from the CCU 8, the image of the tubular organ 31 and the living tissue 31A, for example, as a two-dimensional image shown in FIG. 3. The CCU 8 outputs the video signal of the two-dimensional image, which is obtained by applying the signal processing to the image pickup signal outputted from the image pickup device 16 of the image pickup section 17, to the medical image processing apparatus 3.

The video signal of the two-dimensional image outputted to the medical image processing apparatus 3 is subjected to A/D conversion in the image input section 21 and, then, inputted to the CPU 22.

The CPU 22 performs, for example, processing described below on the basis of the video signal of the two-dimensional image outputted from the image input section 21 and the processing program written in the processing-program storing section 23 to thereby extract edge portions of the living tissue 31A in the two-dimensional image.

First, the CPU 22 having a function of an edge extracting section applies a band-pass filter to, for example, a red component of the two-dimensional image on the basis of the video signal of the two-dimensional image outputted from the image input section 21 to thereby extract all the edge portions included in the two-dimensional image (step S1 in FIG. 4).

Thereafter, the CPU 22 having the function of the edge extracting section thins all the extracted edge portions (step S2 in FIG. 4) and calculates the length L of one edge portion E among all the thinned edge portions (step S3 in FIG. 4). Moreover, the CPU 22 determines whether the length L of the one edge portion E is longer than a threshold thL1 and shorter than a threshold thL2.

When the CPU 22 detects that the length L of the one edge portion E is length equal to or smaller than the predetermined threshold thL1 or equal to or larger than the threshold thL2 (step S4 in FIG. 4), the CPU 22 performs processing indicated by step S11 in FIG. 4 described later. When the CPU 22 detects that the length L of the one edge portion E is larger than the threshold th1 and smaller than the threshold thL2 (step S4 in FIG. 4), the CPU 22 equally divides the one edge portion E into N at control points Cn (n=1, 2, . . . , N) (step S5 in FIG. 4).

Moreover, the CPU 22 acquires a normal NCc drawn from a midpoint Cc of the one edge portion E and acquires N normals NCn drawn from the respective control points Cn (step S6 in FIG. 4). Thereafter, the CPU 22 detects the number Na of normals that cross the normal NCc among the N normals NCn (step S7 in FIG. 4).

The CPU 22 determines whether the number Na of normals that cross the normal NCc among the N normals NCn is larger than a threshold tha. When the CPU 22 detects that the number Na of normals that cross the normal NCc is larger than the threshold tha (step S8 in FIG. 4), the CPU 22 determines that a pixel group ip included in the one edge portion E is a pixel group included in the edge portions of the living tissue 31A and sets a value of a variable edge(i) in respective pixels of the pixel group ip as ON (step S9 in FIG. 4). Moreover, when the CPU 22 detects that the number Na of normals that cross the normal NCc is equal to or smaller than the threshold tha (step S8 in FIG. 4), the CPU 22 determines that the pixel group ip included in the one edge portion E is not the pixel group included in the edge portions of the living tissue 31A and sets a value of the variable edge(i) of the respective pixels of the pixel group ip as OFF (step S10 in FIG. 4).

The CPU 22 determines whether the processing is completed for all the extracted edge portions. When the CPU 22 detects that the processing for all the extracted edge portions is not completed (step S11 in FIG. 4), the CPU 22 applies the processing from step S3 in FIG. 4 to step S10 in FIG. 4 described above to another edge portion. When the CPU 22 detects that the processing for all the extracted edge portions is completed (step S11 in FIG. 4), the CPU 22 finishes a series of processing for extracting edge portions of the living tissue 31A in the two-dimensional image.

Thereafter, the CPU 22 causes the information storing section 25 to temporarily store, as a processing result obtained by performing the series of processing for extracting edge portions of the living tissue 31A in the two-dimensional image described above, the value of the variable edge(i) in the pixel group ip included in the respective edge portions of the two-dimensional image.

The CPU 22 having a function of a three-dimensional-model estimating section performs, according to processing such as geometrical conversion, on the basis of luminance information and the like of the video signal of the two-dimensional image outputted from the image input section 21, image processing for acquiring image data necessary in estimating a three-dimensional model of the tubular organ 31 and the living tissue 31A. In other words, the CPU 22 generates, according to processing such as geometrical conversion, voxels corresponding to respective pixels in the two-dimensional image and acquires the voxels as image data for estimating a three-dimensional model. In short, the pixel group ip is converted as a voxel group ib by the processing described above.

The CPU 22 acquires, according to the processing described above, data of a living tissue boundary portion 31b, which is a plane including the voxel group ib with the variable edge(i) set as ON, as image data for estimating a three-dimensional model of the living tissue 31A shown in FIG. 3. Consequently, for example, when a z axis direction is assumed to be a visual field direction during observation by the endoscope 6, the living tissue 31A is estimated as a three-dimensional model having a shape shown in FIG. 6.

Thereafter, the CPU 22 detects a tuberal shape in the three-dimensional model of the living tissue 31A on the basis of the data of the living tissue boundary portion 31b and by further performing processing described below.

First, the CPU 22 extracts, on the basis of the processing program written in the processing-program storing section 23 and the data of the living tissue boundary portion 31b, one voxel having a largest z coordinate as predetermined one voxel present on a farthest side in the visual field direction of the endoscope 6 among the voxel group ib with the variable edge(i) set as ON and sets the z coordinate of the one voxel as Maxz (step S21 in FIG. 5).

The CPU 22 detects a voxel group rb having z coordinates smaller than Maxz as voxels present nearer to the endoscope 6 in a visual field direction than a position of the one voxel among all the voxels obtained as the image data for estimating a three-dimensional model of the tubular organ 31 and the living tissue 31A (step S22 in FIG. 5).

It is assumed that the voxel group rb described above is a voxel group included in a tuberal shape detection object area AR, i.e., a voxel group to be set as a calculation object of a shape feature value and is a voxel group having R voxels.

To put the processing in steps S21 and S22 in FIG. 5 described above in other words, the CPU 22 having a function of a voxel extracting section extracts, on the basis of positions of respective voxels of the voxel group ib with the variable edge(i) set as ON, the voxel group rb having the R voxels included in the tuberal shape detection object area AR as a predetermined voxel group to be set as a calculation object of a shape feature value.

Moreover, after setting a variable "a" to 1 (step S23 in FIG. 5), the CPU 22 having a function of a shape-feature-value calculating section extracts one voxel Ba (a=1, 2, . . . , R−1, R) among the R voxels of the voxel group rb (step S24 in FIG. 5) and calculates a Shape Index value SBa and a Curvedness value CBa as shape feature values in the one voxel Ba (step S25 in FIG. 5).

The Shape Index value and the Curvedness value described above can be calculated by using, for example, a method same as the method described in US Patent Application Publication No. 2003/0223627. Therefore, in the present embodiment, explanation of the method of calculating the Shape Index value and the Curvedness value in the one voxel Ba is omitted.

The CPU 22 compares the Shape Index value SBa and a threshold Sth of a Shape Index value set in advance and compares the Curvedness value CBa and a threshold Cth of a Curvedness value set in advance. In other words, the CPU 22 having a function of a tuberal-shape detecting section performs, by performing the processing described above, processing for extracting a voxel group, a three-dimensional model of which is estimated as a convex shape, as processing for detecting whether the living tissue 31A has a tuberal shape. In the series of processing shown in FIG. 5, in order to detect the living tissue 31A having a convex shape as a tuberal shape, the threshold Sth is set as 0.9 and the threshold Cth is set as 0.2, for example.

When the CPU 22 having the function of the tuberal-shape detecting section detects that the Shape Index value SBa is larger than the threshold Sth and the Curvedness value CBa is larger than the threshold Cth (step S26 in FIG. 5), the CPU 22 determines that the one voxel Ba is a voxel forming a part of a tuberal shape and sets a value of a variable ryuuki(Ba) in the one voxel Ba as ON (step S27 in FIG. 5).

When the CPU 22 detects that the Shape Index value SBa is equal to or smaller than the threshold Sth or the Curvedness value CBa is equal to or smaller than the threshold Cth (step S26 in FIG. 5), the CPU 22 determines that the one voxel Ba is not a voxel forming a part of a tuberal shape and sets a value of the variable ryuuki(Ba) in the one voxel Ba as OFF (step S28 in FIG. 5).

Thereafter, the CPU 22 determines whether the processing described above is performed in all the R voxels, i.e., whether the variable "a" is R.

When the CPU 22 detects that "a" is not R (step S29 in FIG. 5), after performing processing for adding 1 to a variable "i" (step S30 in FIG. 5), the CPU 22 performs the processing indicated by steps S24 to S29 in FIG. 5 again.

When the CPU 22 detects that "a" is R (step S29 in FIG. 5), the CPU 22 completes the series of processing for detecting a tuberal shape in the three-dimensional model of the living tissue 31A.

The CPU 22 applies, for example, in a three-dimensional model having voxels with a value of ryuuki(Ba) set as ON, control for superimposing, on the three-dimensional model, a character string, coloring, or the like for indicating that the living tissue 31A has a tuberal shape to the display processing section 28. Consequently, a three-dimensional model of the tubular organ 31 and the living tissue 31A, in which the user can easily find the living tissue 31A having the tuberal shape, is displayed as an image on the monitor 4.

The CPU 22 may detect, on the basis of the positions of the respective voxels with a value of ryuuki(Ba) set as ON, respective pixels on the two-dimensional image present in positions corresponding to the positions of the respective voxels and apply control for superimposing, on the two-dimensional image having the respective pixels, a character string, coloring, or the like for indicating that the living tissue 31A has the tuberal shape to the display processing section 28.

In the series of processing described above, the tuberal shape detection object area AR is not limited to that set as an area including a voxel group having z coordinates smaller than Maxz. For example, as shown in FIG. 8, the tuberal shape detection object area AR may be set as an area including only a voxel group present near the living tissue boundary portion 31b.

By performing the series of processing described above, the medical image processing apparatus 3 according to the present embodiment can prevent the user from overlooking a lesion area such as a polyp. Therefore, the medical image processing apparatus 3 can reduce a burden on the user.

The medical image processing apparatus 3 according to the present embodiment applies the processing for detecting a tuberal shape of the living tissue 31A described above to only a voxel group included in the tuberal shape detection object area AR in the three-dimensional model. Therefore, the medical image processing apparatus 3 according to the present embodiment can quickly perform detection of the tuberal shape of the living tissue 31A.

Second Embodiment

FIGS. 9 to 15 relate to a second embodiment of the present invention. Detailed explanation of sections having configurations same as those in the first embodiment is omitted. Components same as those in the first embodiment are denoted by the identical reference numerals and signs and explanation of the components is omitted. Moreover, a configuration of the endoscope system 1 used in the present embodiment is the same as that in the first embodiment.

Figure 9:
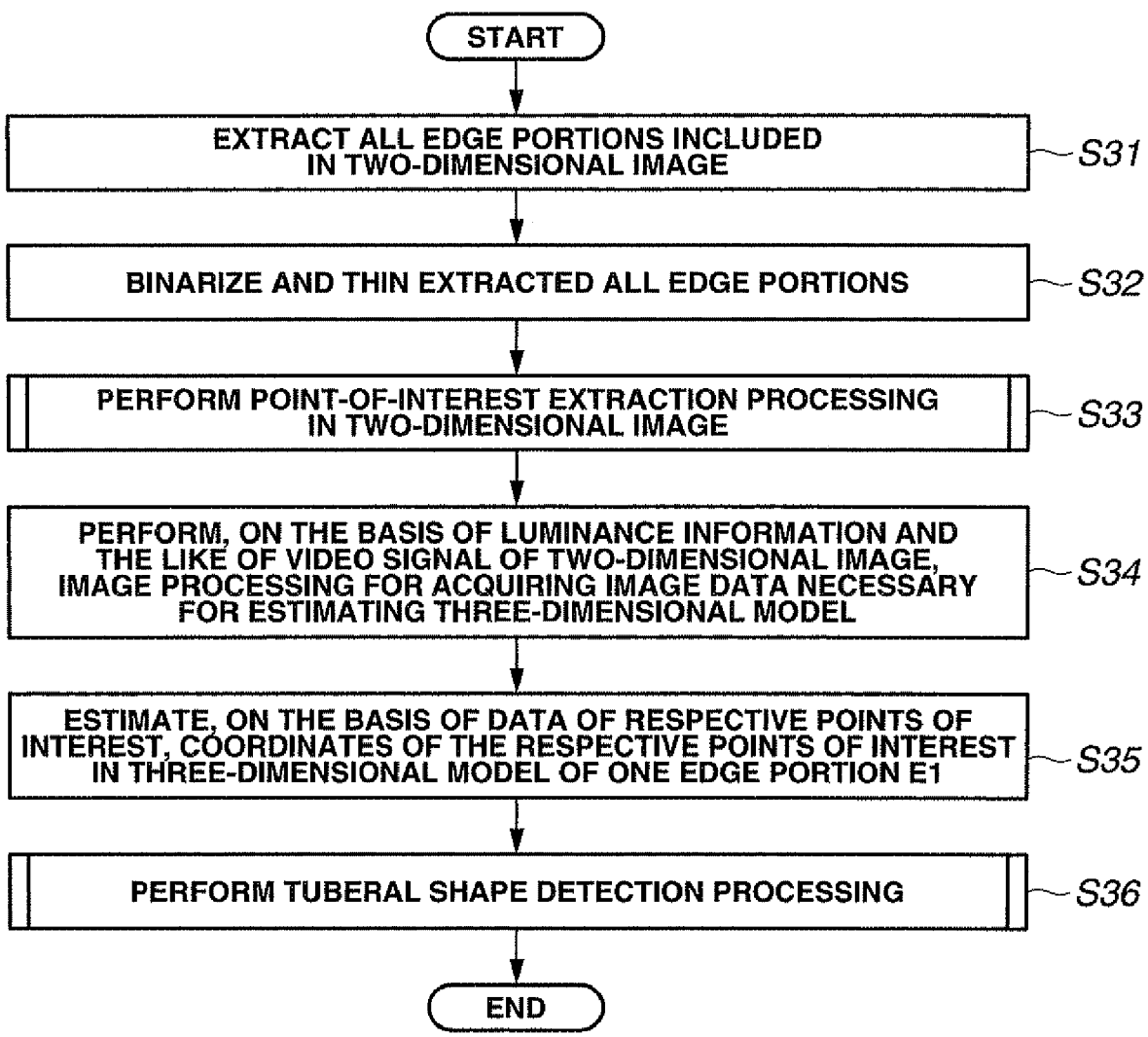
FIG. 9 is a flowchart showing an overview of a procedure of processing performed by the medical image processing apparatus shown in FIG. 1 in a second embodiment.
Figure 10:
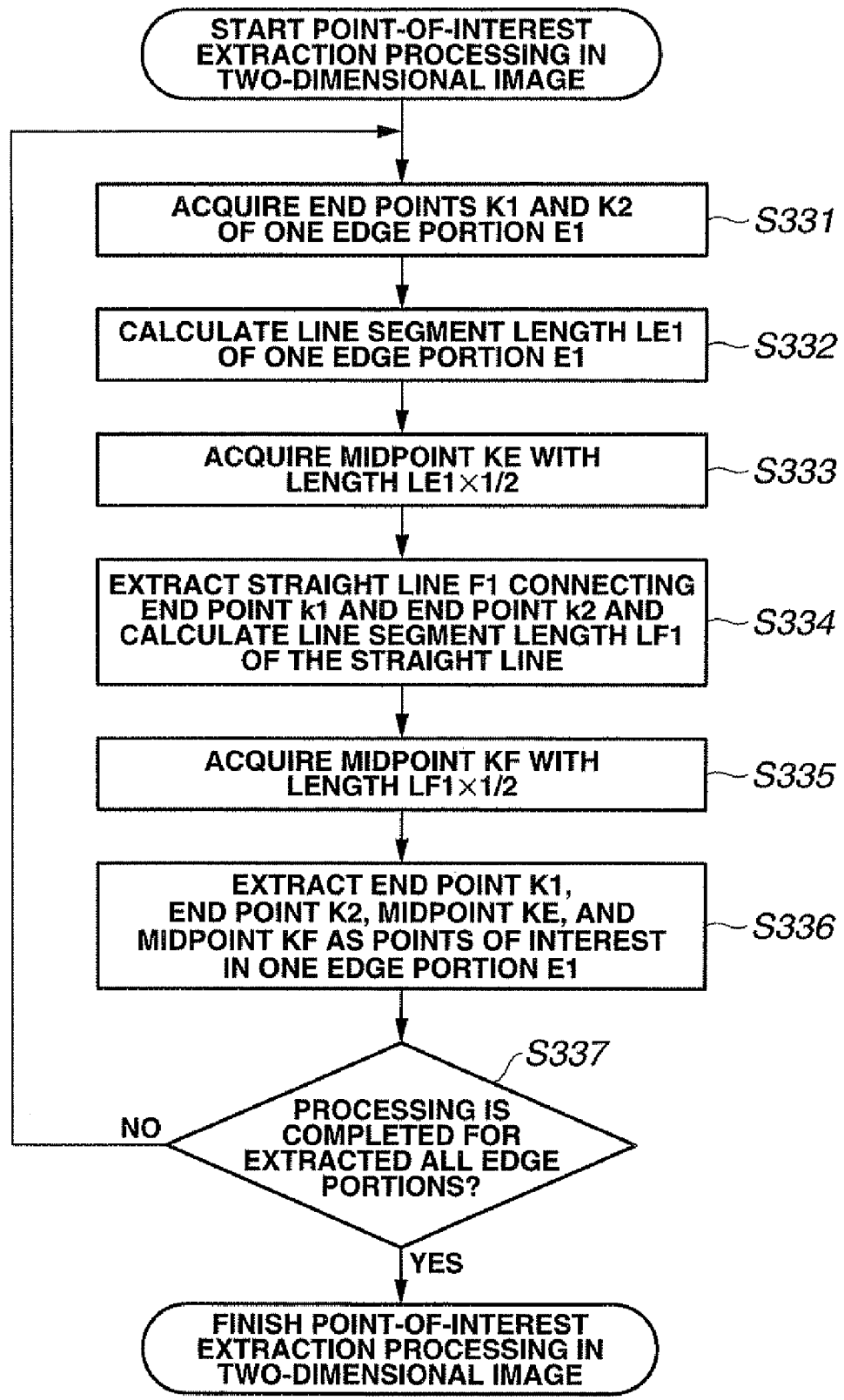
FIG. 10 is a flowchart showing a specific procedure of point-of-interest extraction processing in FIG. 9.
Figure 11:
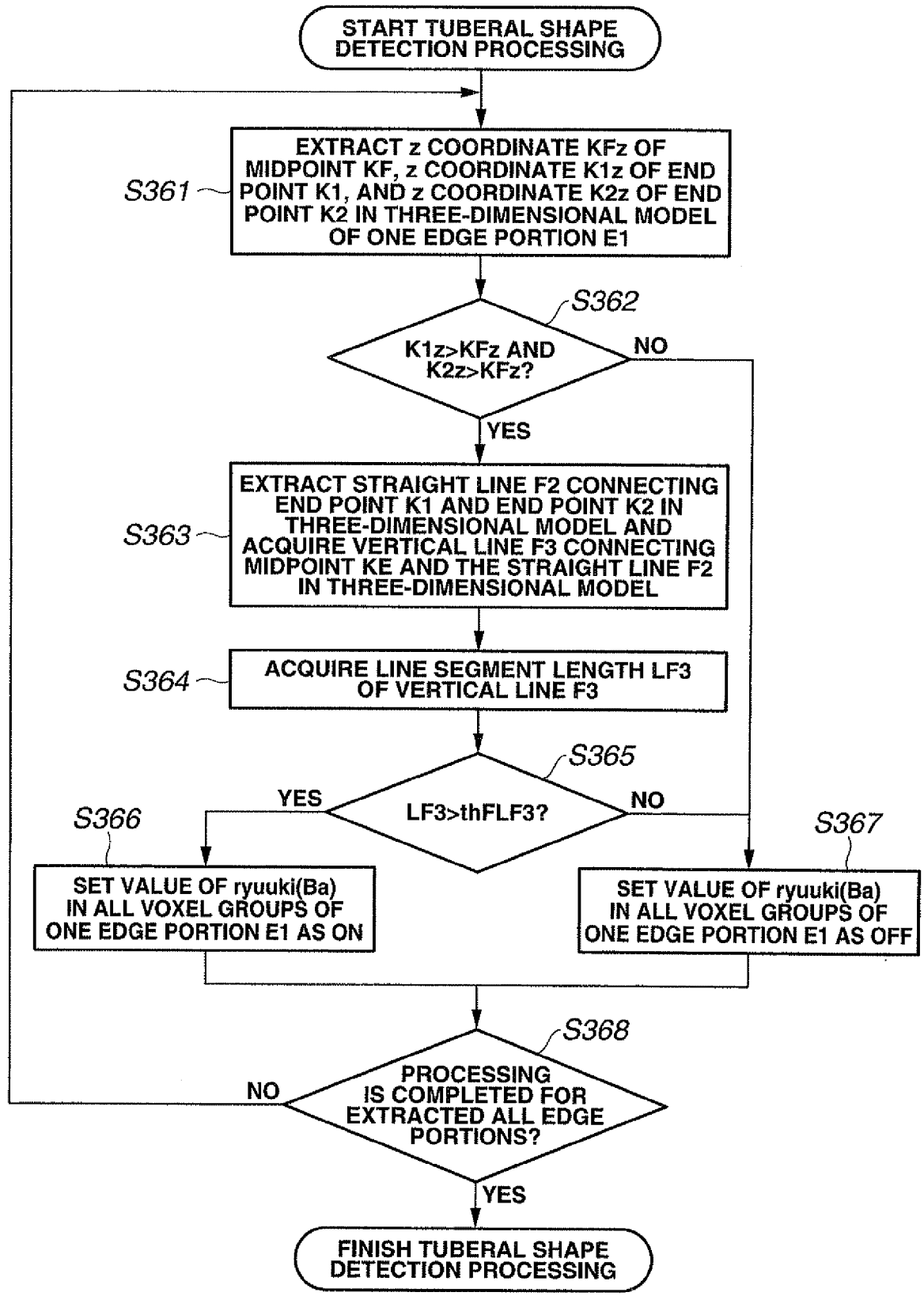
FIG. 11 is a flowchart showing a specific procedure of tuberal shape detection processing in FIG. 9.
Figure 12:
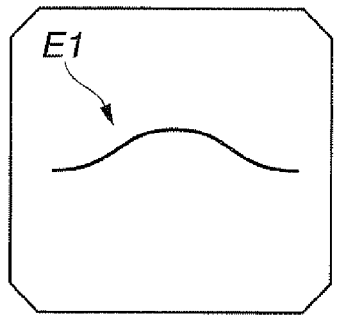
FIG. 12 is a diagram showing an example of a case in which a two-dimensional image including edge portions of a living tissue is thinned by the medical image processing apparatus shown in FIG. 1 performing the processing according to the second embodiment.
Figure 13:
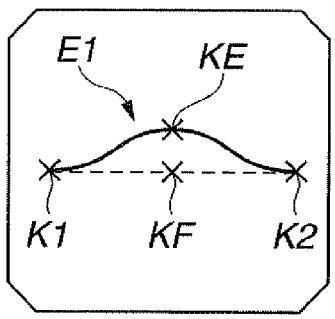
FIG. 13 is a diagram showing an example of a position relation of respective points of interest in the thinned two-dimensional image shown in FIG. 12.
Figure 14:
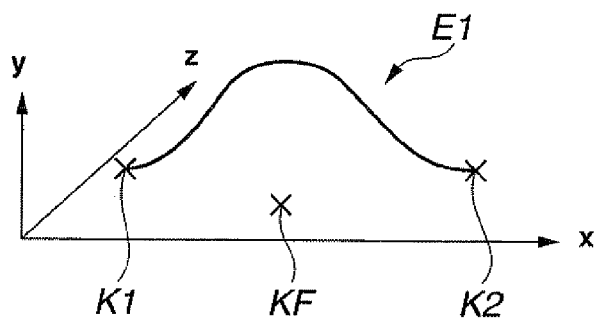
FIG. 14 is a diagram of an example of a position relation of respective points of interest in a three-dimensional model of the living tissue obtained by the medical image processing apparatus shown in FIG. 1 performing the processing according to the second embodiment.
Figure 15:
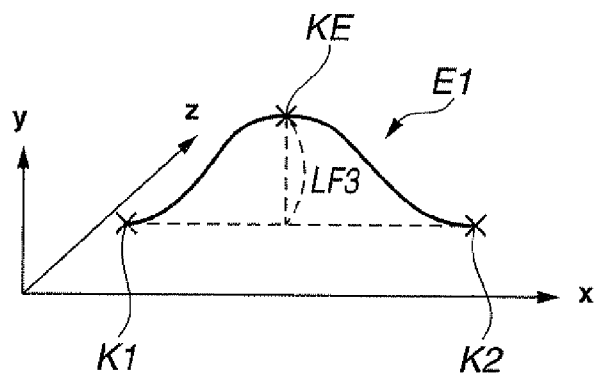
FIG. 15 is a diagram showing an example different from that shown in FIG. 14 of the position relation of the respective points of interest in the three-dimensional model of the living tissue obtained by the medical image processing apparatus shown in FIG. 1 performing the processing according to the second embodiment.

FIG. 9 is a flowchart showing an overview of a procedure of processing performed by the medical image processing apparatus shown in FIG. 1 in the second embodiment. FIG. 10 is a flowchart showing a specific procedure of point-of-interest extraction processing in FIG. 9. FIG. 11 is a flowchart showing a specific procedure of tuberal shape detection processing in FIG. 9. FIG. 12 is a diagram showing an example of a case in which a two-dimensional image including edge portions of a living tissue is thinned by the medical image processing apparatus shown in FIG. 1 performing the processing according to the second embodiment. FIG. 13 is a diagram showing an example of a position relation of respective points of interest in the thinned two-dimensional image shown in FIG. 12. FIG. 14 is a diagram of an example of a position relation of respective points of interest in a three-dimensional model of the living tissue obtained by the medical image processing apparatus shown in FIG. 1 performing the processing according to the second embodiment. FIG. 15 is a diagram showing an example different from that shown in FIG. 14 of the position relation of the respective points of interest in the three-dimensional model of the living tissue obtained by the medical image processing apparatus shown in FIG. 1 performing the processing according to the second embodiment.

First, the CPU 22 having the function of the edge extracting section applies, on the basis of a video signal of a two-dimensional image obtained by picking up an image of the tubular organ 31 and the living tissue 31A, which is outputted from the image input section 21, a band-pass filter to, for example, a red component of the two-dimensional image to thereby extract all edge portions included in the two-dimensional image (step S31 in FIG. 9).

Thereafter, the CPU 22 having the function of the edge extracting section binarizes and thins all the extracted edge portions (step S32 in FIG. 9) and performs point-of-interest extraction processing in the thinned two-dimensional image (step S33 in FIG. 9).

Specifically, when, for example, an image including one edge portion E1 of the living tissue 31A shown in FIG. 12 is acquired as the two-dimensional image with the thinned edge portions, first, the CPU 22 having a function of an edge-information acquiring section acquires end points K1 and K2 as position information of positions as ends of one edge in a thin line of the one edge portion E1 (step S331 in FIG. 10).

Next, the CPU 22 having the function of the edge-information acquiring section calculates segment length LE1 of the thin line of the one edge portion E1 as shape information concerning a shape of the one edge portion E1 (step S332 in FIG. 10) and acquires a midpoint KE with length LE1×½ (step S333 in FIG. 10).

The CPU 22 having the function of the edge-information acquiring section extracts a straight line F1 connecting the end point K1 and the end point K2 as shape information concerning the shape of the one edge portion E1, calculates the length LF1 of the straight line (step S334 in FIG. 10), and acquires a midpoint KF with length LF1×½ (step S335 in FIG. 10).

The CPU 22 extracts the end point K1, the end point K2, the midpoint KE, and the midpoint KF as points of interest in the one edge portion E1 (step S336 in FIG. 10). The end point K1, the end point K2, the midpoint KE, and the midpoint KF in the one edge portion E1 are extracted as, for example, points of interest having a position relation shown in FIG. 13, respectively.

The CPU 22 determines whether the processing is completed for all the extracted edge portions. When the CPU 22 detects that the processing for all the extracted edge portions is not completed (step S337 in FIG. 10), the CPU 22 applies the processing from step S331 in FIG. 10 to step S336 in FIG. 10 described above to another edge portion. When the CPU 22 detects that the processing for all the extracted edge portions is completed (step S337 in FIG. 10), the CPU 22 finishes the point-of-interest extraction processing in the two-dimensional image.

The CPU 22 causes the information storing section 25 to temporarily store, as a processing result obtained by performing the point-of-interest extraction processing in the two-dimensional image described above, data of the end point K1, the end point K2, the midpoint KE, and the midpoint KF, which are the points of interest of the respective edge portions of the two-dimensional image.

After performing the point-of-interest extraction processing in the two-dimensional image, the CPU 22 having the function of the three-dimensional-model estimating section performs, according to processing such as geometrical conversion, on the basis of luminance information and the like of the video signal of the two-dimensional image outputted from the image input section 21, image processing for acquiring image data necessary in estimating a three-dimensional model of the tubular organ 31 and the living tissue 31A (step S34 in FIG. 9). In other words, the CPU 22 generates, according to processing such as geometrical conversion, voxels corresponding to respective pixels in the two-dimensional image and acquires the voxels as image data for estimating a three-dimensional model.

Moreover, the CPU 22 estimates, on the basis of the data of the end point K1, the end point K2, the midpoint KE, and the midpoint KF, which is data of the respective points of interest stored in the information storing section 25, coordinates of the respective points of interest in the three-dimensional model of the one edge portion E1 of the living tissue 31A (step S35 in FIG. 9). The end point K1, the end point K2, the midpoint KE, and the midpoint KF in the three-dimensional model of the one edge portion E1 are estimated as, for example, having a position relation shown in FIG. 14, respectively, by the processing described above.

The CPU 22 further performs tuberal shape detection processing described later on the basis of the coordinates of the respective points of interest estimated by the processing described above to thereby detect a tuberal shape in the three-dimensional model of the living tissue 31A (step S36 in FIG. 9).

Specifically, first, the CPU 22 having a function of a three-dimensional-model-information acquiring section extracts a z coordinate KFz of the midpoint KF, a z coordinate K1z of the end point K1, and a z coordinate K2z of the end point K2 in the three-dimensional model of the one edge portion E1 as depth information in the three-dimensional model of the living tissue 31A (step S361 in FIG. 11).

Next, the CPU 22 having the function of the tuberal-shape detecting section compares a value of the z coordinate KFz of the midpoint KF with a value of the z coordinate K1z of the end point K1 and a value of the z coordinate K2z of the end point K2. When the CPU 22 detects that the value of the z coordinate KFz of the midpoint KF is smaller than the value of the z coordinate K1z of the end point K1 and the value of the z coordinate KFz of the midpoint KF is smaller than the value of the z coordinate K2z of the end point K2 (step S362 in FIG. 11), the CPU 22 further performs processing indicated by step S363 in FIG. 11 described later. When the CPU 22 detects that the value of the z coordinate KFz of the midpoint KF is equal to or larger than the value of the z coordinate K1z of the end point K1 or the value of the z coordinate KFz of the midpoint KF is equal to or larger than the value of the z coordinate K2z of the end point K2 (step S362 in FIG. 11), the CPU 22 determines that the one edge portion E1 of the living tissue 31A is not an edge portion forming a tuberal shape and performs processing indicated by step S367 in FIG. 11 described later.

When the CPU 22 having the function of the three-dimensional-model-information acquiring section detects that the value of the z coordinate KFz of the midpoint KF is smaller than the value of the z coordinate K1z of the end point K1 and the value of the z coordinate KFz of the midpoint KF is smaller than the value of the z coordinate K2z of the end point K2 (step S362 in FIG. 11), the CPU 22 extracts a straight line F2 connecting the end point K1 and the end point K2 in the three-dimensional model and acquires a vertical line F3 as a straight line connecting the midpoint KE and the straight line F2 in the three-dimensional model (step S363 in FIG. 11). Thereafter, the CPU 22 acquires segment length LF3 of the vertical line F3 as height information in the three-dimensional model of the living tissue 31A (step S364 in FIG. 11) and compares the segment length LF3 and a threshold thLF3 of the segment length LF3.

When the CPU 22 having the function of the tuberal-shape detecting section detects that a value of the segment length LF3 is larger than the threshold thLF3 (step S365 in FIG. 11), the CPU 22 determines that the one edge portion E1 of the living tissue 31A is an edge portion forming a tuberal shape and sets a value of a variable ryuuki(E1) in all voxel groups of the one edge portion E1 as ON (step S366 in FIG. 11). When the CPU 22 detects that a value of the segment length LF3 is equal to or smaller than the threshold thLF3 (step S365 in FIG. 11), the CPU 22 determines that the one edge portion E1 of the living tissue 31A is not an edge portion forming a tuberal shape and sets a value of the variable ryuuki(E1) in all the voxel groups of the one edge portion E1 as OFF (step S367 in FIG. 11).

The CPU 22 determines whether the processing is completed for all the extracted edge portions. When the CPU 22 detects that the processing is not completed for all the extracted edge portions (step S368 in FIG. 11), the CPU 22 applies the processing from step S361 in FIG. 11 to step S367 in FIG. 11 described above to another edge portion. When the CPU 22 detects that the processing for all the extracted edge portions is completed (step S368 in FIG. 11), the CPU 22 finishes the tuberal shape detection processing in the three-dimensional model of the living tissue 31A.

At a point when the tuberal shape detection processing shown in FIG. 11 described above is finished, the CPU 22 completes the series of image processing shown in FIG. 9.

In the processing indicated by step S362 in FIG. 11 of the tuberal shape detection processing described above, the CPU 22 performs not only the comparison and the judgment based on values of the z coordinates of the respective points of interest. The CPU 22 may perform comparison and judgment based on red component values of the respective points of interest described later, for example.

Specifically, first, the CPU 22 extracts a red component value RKF at the midpoint KF, a red component value R11 at the end point K1, and a red component value RK2 at the end point K2. When the CPU 22 detects that the red component value RKF at the midpoint KF is larger than the red component value RK1 at the end point K1 and the red component value RKF at the midpoint KF is larger than the red component value RK2 at the end point K2, the CPU 22 further performs the processing in step S363 in FIG. 11 described above. When the CPU 22 detects that the red component value RKF at the midpoint KF is equal to or smaller than the red component value RK1 at the end point K1 or the red component value RKF at the midpoint KF is equal to or smaller than the red component value RK2 at the end point K2, the CPU 22 determines that the one edge portion E1 of the living tissue 31A is not an edge portion forming a tuberal shape and performs the processing in step S367 in FIG. 11 described above.

The CPU 22 applies, for example, in a three-dimensional model having voxels with a value of ryuuki(E1) set ON, control for superimposing, on the three-dimensional model, a character string, coloring, or the like for indicating that the living tissue 31A has the tuberal shape to the display processing section 28. Consequently, a three-dimensional model of the tubular organ 31 and the living tissue 31A, in which the user can easily find the living tissue 31A having the tuberal shape, is displayed as an image on the monitor 4.

The CPU 22 may detect, on the basis of the positions of the respective voxels with a value of ryuuki(E1) set ON, respective pixels on the two-dimensional image present in positions corresponding to the positions of the respective voxels and apply control for superimposing, on the two-dimensional image having the respective pixels, a character string, coloring, or the like for indicating that the living tissue 31A has the tuberal shape to the display processing section 28.

By performing the series of processing described above, the medical image processing apparatus 3 according to the present embodiment can prevent the user from overlooking a lesion area such as a polyp. Therefore, the medical image processing apparatus 3 can reduce a burden on the user.

The medical image processing apparatus 3 according to the present embodiment quantitatively detects whether the living tissue 31A has a tuberal shape as described above while calculating a value peculiar to the tuberal shape. Therefore, the medical image processing apparatus 3 according to the present embodiment can accurately perform detection of the tuberal shape of the living tissue 31A.

It goes without saying that the present invention is not limited to the embodiments described above and various modifications and applications of the embodiments are possible within a range not departing from the spirit of the invention.

What is claimed is:

1. A medical image processing apparatus comprising:
   an edge extracting section that extracts, on the basis of a two-dimensional image of an image of a living tissue in a body cavity inputted from a medical image pickup apparatus, edges of the two-dimensional image;
   a three-dimensional-model estimating section that estimates a three-dimensional model of the living tissue on the basis of the two-dimensional image;
   a voxel extracting section that extracts, on the basis of positions of respective voxels, where the edges are present, estimated as a part of the three-dimensional model, a predetermined voxel group to be set as a calculation object of a shape feature value;
   a shape-feature-value calculating section that calculates the shape feature value for at least a part of voxels among the predetermined voxel group extracted by the voxel extracting section; and
   a tuberal-shape detecting section that extracts, on the basis of the shape feature value, a voxel group, a three-dimensional model of which is estimated as a predetermined shape, among at least the part of voxels and detects the voxel group as a voxel group forming a tuberal shape in the three-dimensional model of the living tissue.

2. The medical image processing apparatus according to claim 1, wherein the predetermined voxel group is a voxel group present nearer to the medical image pickup apparatus in a visual field direction than a predetermined one voxel included in the respective voxels in which the edges are present.

3. The medical image processing apparatus according to claim 2, wherein the predetermined one voxel is one voxel present on a farthest side in the visual field direction among the respective voxels in which the edges are present.

4. The medical image processing apparatus according to claim 1, wherein the predetermined shape is a convex shape.

5. A medical image processing method comprising:
   an edge extracting step of extracting, on the basis of a two-dimensional image of an image of a living tissue in a body cavity inputted from a medical image pickup apparatus, edges of the two-dimensional image;
   a three-dimensional-model estimating step of estimating a three-dimensional model of the living tissue on the basis of the two-dimensional image;
   a voxel extracting step of extracting, on the basis of positions of respective voxels, where the edges are present, estimated as a part of the three-dimensional model, a predetermined voxel group to be set as a calculation object of a shape feature value;
   a shape-feature-value calculating step of calculating the shape feature value for at least a part of voxels among the voxel group extracted in the voxel extracting step; and
   a tuberal-shape detecting step of extracting, on the basis of the shape feature value, a voxel group, a three-dimensional model of which is estimated as a predetermined shape, among at least the part of voxels and detecting the voxel group as a voxel group forming a tuberal shape in the three-dimensional model of the living tissue.

6. The medical image processing method according to claim 5, wherein the predetermined voxel group is a voxel group present nearer to the medical image pickup apparatus in a visual field direction than a predetermined one voxel included in the respective voxels in which the edges are present.

7. The medical image processing method according to claim 6, wherein the predetermined one voxel is one voxel present on a farthest side in the visual field direction among the respective voxels in which the edges are present.

8. The medical image processing method according to claim 5, wherein the predetermined shape is a convex shape.

* * * * *